United States Patent
McQuillan et al.

(10) Patent No.: US 7,207,048 B2
(45) Date of Patent: Apr. 17, 2007

(54) GATEWAY FOR INTERACTION OF TELECOMMUNICATIONS NETWORK RESOURCES AND APPLICATIONS

(75) Inventors: Liam McQuillan, Belfast (GB); Kleran Dalton, Lisburn (GB)

(73) Assignee: AePona Limited, Belfast, Northern Ireland (GB)

( * ) Notice: Subject to any disclaimer, the term of this patent is extended or adjusted under 35 U.S.C. 154(b) by 616 days.

(21) Appl. No.: 10/354,977

(22) Filed: Jan. 31, 2003

(65) Prior Publication Data

US 2003/0177281 A1 Sep. 18, 2003

Related U.S. Application Data

(63) Continuation of application No. PCT/EP01/08854, filed on Jul. 31, 2001.

(30) Foreign Application Priority Data

Aug. 2, 2000 (EP) .................................. 00650092

(51) Int. Cl.
*G06F 3/00* (2006.01)
(52) U.S. Cl. .................................................... 719/328
(58) Field of Classification Search ................. 719/328
See application file for complete search history.

(56) References Cited

U.S. PATENT DOCUMENTS

| | | | | |
|---|---|---|---|---|
| 6,298,478 | B1 * | 10/2001 | Nally et al. .................. | 717/170 |
| 6,343,318 | B1 * | 1/2002 | Hawkins et al. ............ | 709/219 |
| 6,480,860 | B1 * | 11/2002 | Monday ...................... | 707/102 |
| 6,512,824 | B1 * | 1/2003 | Hsieh et al. ................. | 379/230 |
| 6,526,581 | B1 * | 2/2003 | Edson .......................... | 725/74 |
| 6,643,652 | B2 * | 11/2003 | Helgeson et al. ............. | 707/10 |
| 6,822,954 | B2 * | 11/2004 | McConnell et al. ........ | 370/352 |
| 7,010,586 | B1 * | 3/2006 | Allavarpu et al. .......... | 709/223 |
| 2005/0147133 | A1 * | 7/2005 | Tang et al. ................. | 370/537 |

FOREIGN PATENT DOCUMENTS

| | | |
|---|---|---|
| WO | WO00/22792 | 4/2000 |
| WO | WO00/42760 | 7/2000 |

OTHER PUBLICATIONS

Rob Brennan, Evolutionary Trends in Intelligent Netwoks, Jun. 2000.*
Brennan et al, IEEE Communications Magazine, Jun. 2000, pp. 86-93, Evolutionary Trends in Intelligent Networks.
Rosenberg et al, IEEE Network, May/Jun. 1999, pp. 42-49, Programming Internet Telphony Services.

* cited by examiner

Primary Examiner—William Thomson
Assistant Examiner—LeChi Truong
(74) Attorney, Agent, or Firm—Jacobson Holman PLLC

(57) ABSTRACT

A gateway (1) has a platform on which resides a CORBA bus (22) an inner layer (23) of Parlay APIs, and an outer layer (24) of network service interfaces for controlling network resources (2). The gateway (1) also comprises application interfaces (20) and Parlay APIs (21) residing on remote platforms which also host applications (10, 13, 14) wishing to access the network resources (2). The network resources (2) interface directly with the Parlay APIs (23) if they have Parlay APIs themselves, or otherwise with the interfaces (24). On the application side, the application interfaces (20) are provided as Java Beans which may be instantiated by an XML interpreter in response to high level XML commands defining application-side interfacing requirements.

12 Claims, 4 Drawing Sheets

GATEWAY FOR INTERACTION OF TELECOMMUNICATIONS NETWORK RESOURCES AND APPLICATIONS

This is a continuation of PCT/EP01/08854 filed Jul. 31, 2001 and published in English.

INTRODUCTION

1. Field of the Invention

The invention relates to a gateway for allowing interaction of an operator's network resources (for example HLR, SMSC, or an IVR platform) with applications for provision of user services.

2. Prior Art Discussion

It is known for network subscriber services to be provided by applications. However, heretofore such applications have typically been hosted in the operator's network, for example, pre-paid, call forwarding, or voice mail services. A problem with this approach is that detailed knowledge of the particular systems is required to program them for the interaction required. This is time-consuming and expensive, and allows limited flexibility.

This is one of the reasons why the "Parlay" standard was developed to provide a mechanism for open APIs allowing applications located either within or without the network to access network nodes. While this is an important development, there is a need for a gateway to make use of the Parlay standard to allow simple and flexible linking of network nodes with applications with minimum lead time. Achievement of a short lead time is particularly important for network operators as they strive to provide an ever-increasing variety of subscriber services to maintain subscriber numbers and increase revenues.

International Patent Specification No. WO00/42760 (Ericsson) describes a method of accessing a service node from a network end terminal, in which the network has a VoIP portion and a cellular portion. While this appears to be effective for the particular requirement involving VoIP, there is a need for a gateway to allow versatile access by a wide range of applications to a wide range of network resources.

The invention is directed towards providing such a gateway.

SUMMARY OF THE INVENTION

According to the invention, there is provided a gateway for interaction of applications with telecommunication network resources, the gateway comprising means for interfacing with said applications and means for interfacing with said network resources, characterised in that, the network interfacing means comprises:
an outer layer of network service interfaces comprising means for interfacing with and controlling network resources; and
an inner layer of open-standard APIs comprising means for interfacing with network resources having corresponding open-standard APIs and for interfacing with network service interfaces of the outer layer.

In one embodiment, the gateway further comprises a middleware bus residing between said application interfacing means and said network interfacing means inner layer.

In another embodiment, said middleware bus complies with the CORBA standard.

In a further embodiment, the gateway comprises a service gateway comprising inner layer open-standard services, outer layer service level programs, and means for managing interaction between the service level programs and network traffic.

In one embodiment, the service layer programs comprise means for providing call state machines for managing communication dialogue.

In another embodiment, the service gateway comprises a notification demultiplexer comprising means for dispatching network notifications to the service logic programs and to applications.

In a further embodiment, the outer layer comprises a network gateway comprising signalling stacks and means for performing translation between said stacks and the service logic programs of the service gateway.

In one embodiment, the inner layer comprises:
an open-standard framework interface to the middleware bus, and
an open-standard service interface to the middleware bus for interaction with applications.

In one embodiment, the gateway comprises a framework comprising management, provisioning, subscription, and security functions to the outer layer and to the inner layer.

In another embodiment, the gateway comprises platform resources for providing the following functions to the inner layer and to the outer layer:
a persistent data store for control and configuration tables; and
a communications function for internal communication which does not use a distributed object middleware communication mechanism; and
an event manager providing a standard interface to functions within the gateway for receiving events, for classifying received events into information, error, and critical categories, and for logging the events.

In one embodiment, said platform resources further comprises a timer function comprising means for invoking and cancelling timers for functions of the gateway.

In one embodiment, the gateway comprises:
a management entity for routing gateway management signals;
a Web server linked with the management entity and comprising means for communication with management interfaces on separate hardware platforms;
a platform manager linked with the management entity and comprising means for controlling start-up and shut-down of a primary hardware platform for the inner layer and the outer layer.

In one embodiment, the means for interfacing with the applications comprises an application-side layer of components having an application interface and logic and a network-side layer comprising open-standard APIs for communication with the open-standard APIs of the inner layer.

In another embodiment, the application-side layer and the network-side layer are present on a platform for each application and said platforms are remote from a platform of the inner layer and the outer layer.

In another embodiment, the application-side layer comprises re-usable objects and means for instantiating the objects to provide a component.

In one embodiment, said instantiation means comprises an XML interpreter comprising means for interpreting user inputs of high-level interfacing commands.

According to another aspect, there is provided an application client for interfacing between an application and gateway open-standard APIs providing access to network resources, the client comprising:
a core of open-standard APIs, and re-usable objects, and means for instantiating said objects to provide components with logic and an application interface.

In one embodiment, the instantiating means comprises an XML interpreter, and a user interface for directing input of high level XML commands defining interfacing requirements.

In another embodiment, the application client further comprises reusable utility objects, and means for instantiating said objects to provide components for logging, tracing, database access, and timer functions.

DETAILED DESCRIPTION OF THE INVENTION

BRIEF DESCRIPTION OF THE DRAWINGS

The invention will be more clearly understood from the following description of some embodiments thereof, given by way of example only with reference to the accompanying drawings in which:—

DESCRIPTION OF THE EMBODIMENTS

Figure 1:
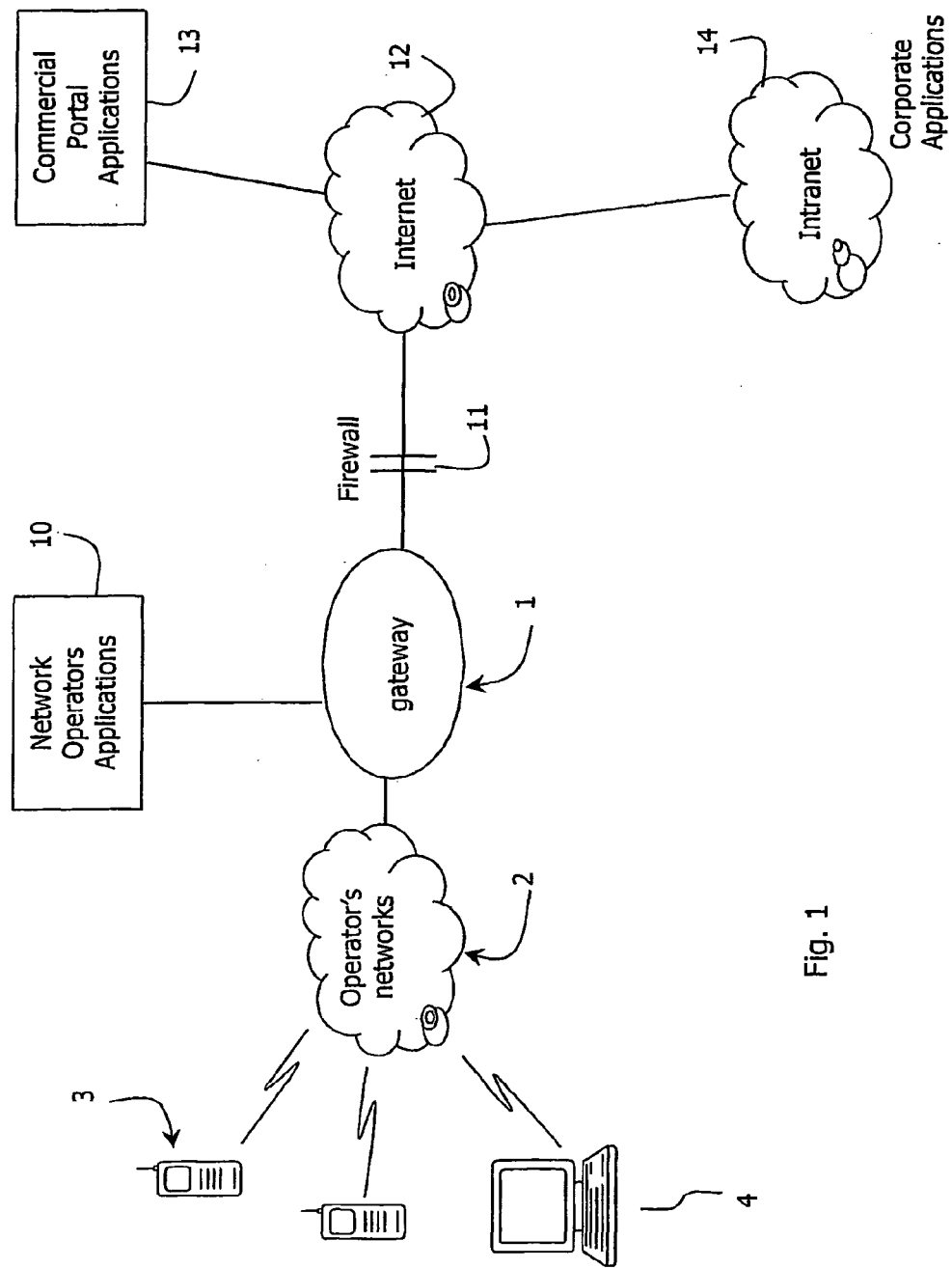
FIG. 1 is a diagram illustrating the context of a gateway of the invention.

Referring to FIG. 1, a gateway 1 interacts on one side with networks 2 of one or more operators. The networks 2 include both fixed-line and wireless networks, although they may be of only one such type. This side of the gateway 1 ultimately interfaces with subscriber mobile phones 2, computers 4 and other user devices. On an application side the gateway 1 interfaces with applications 10 hosted by the network operators, and (via a firewall 11 and the Internet 12) with commercial portal applications 13 hosted by ASPs and with corporate applications within an Intranet 14.

Figure 2:
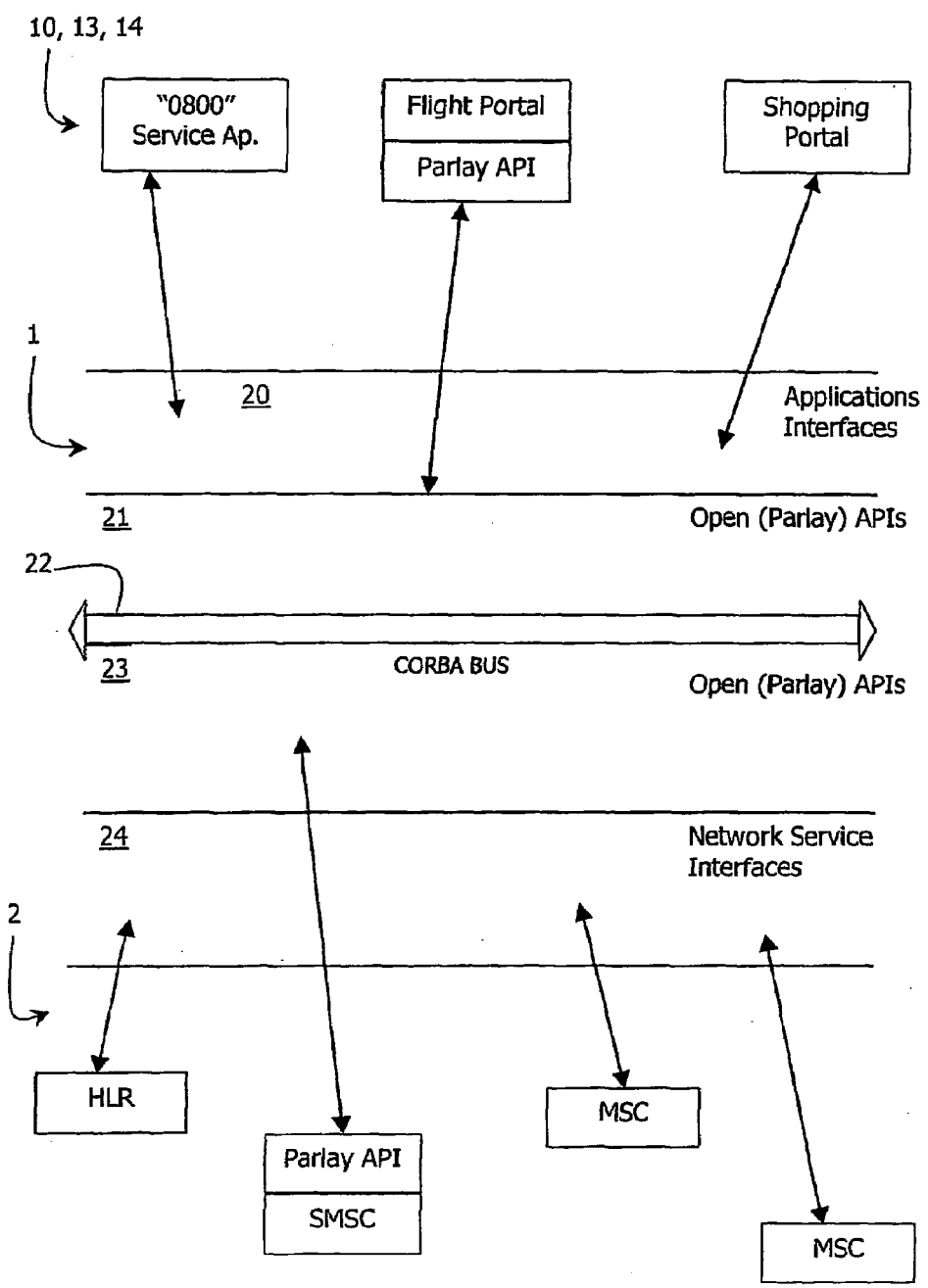
FIG. 2 is a diagram illustrating logical structure of the gateway.

In more detail, referring to FIG. 2 the applications 10, 13, and 14 include free "0800" services, an airline flight portal, and a shopping portal in an illustrative example. On the network side 3 the network nodes include a HLR, MSCs, and an SMSC. The gateway 1 has a four-layer structure of layers 20, 21, 23, and 24 and a central CORBA bus 22. The purpose of the gateway 1 is to allow the applications to access the network resources.

The layer 20 comprises interface components configured to suit the applications. Each interface component includes an application interface, a Parlay interface, and a logic in-between.

The layers 21 and 23 each comprise open Parlay APIs, in the layer 21 suitable for interfacing with the layer 20 component Parlay interfaces, and in the layer 23 suitable for network-node interfacing. Such APIs are, at an abstracted level, specified in the Parlay specifications.

The layer 24 comprises network service interfaces for interfacing with and controlling network resources. Thus, at a high level there is symmetry of the gateway 1 around the CORBA bus 22, the latter providing middleware between the Parlay APIs.

As illustrated by the arrows some of the applications interface with the layer 20, while others have a Parlay API and so interface directly with the layer 21. Likewise, some network nodes interface with the layer 24 and others directly with the Parlay APIs in the layer 23. However, directly or indirectly, all interactions pass through the Parlay layers 21 and 23 and so these layers and the CORBA bus 22 act as a central middleware core of the gateway 1.

Figure 3:
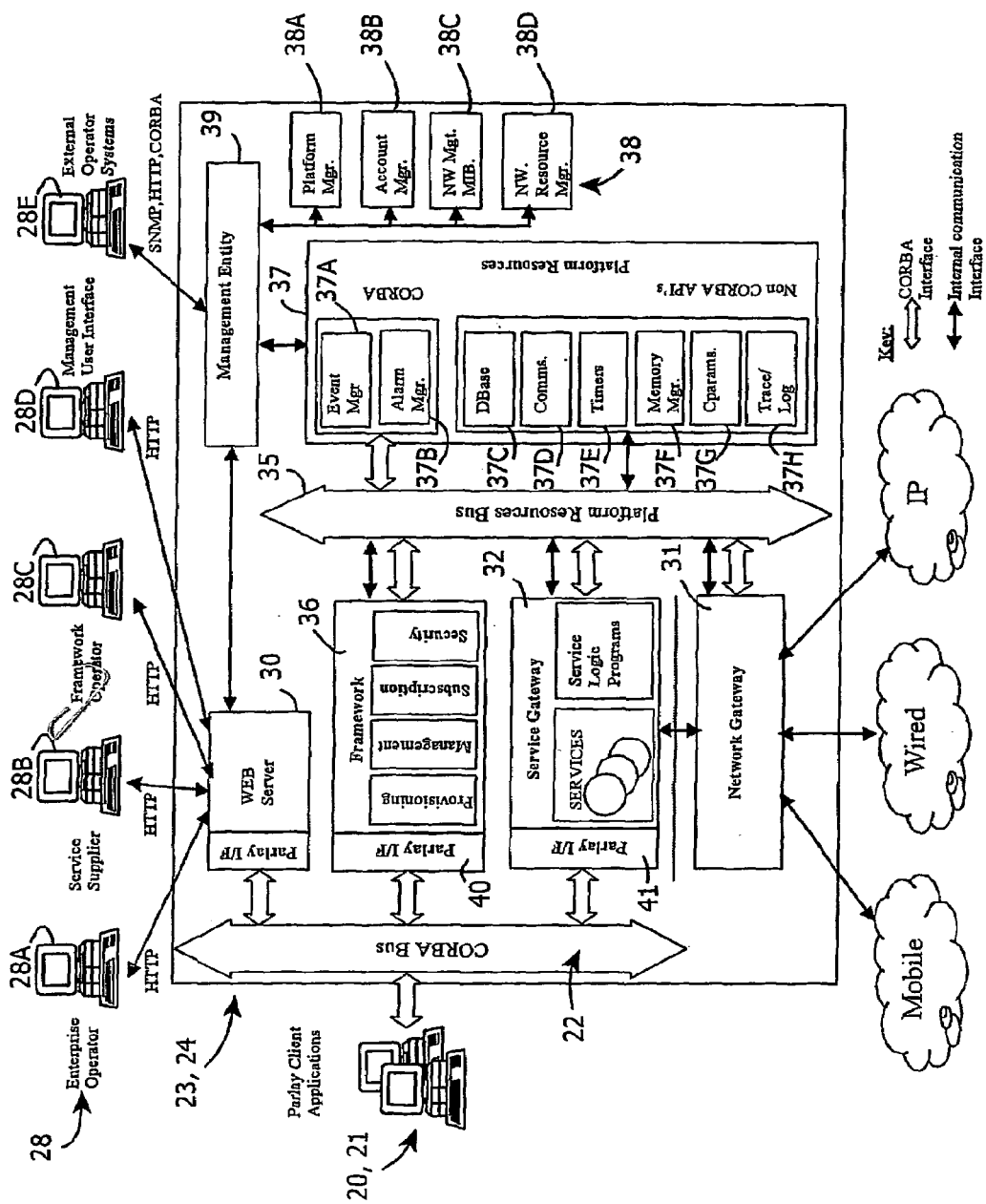
FIG. 3 is a diagram illustrating network-side structure of the gateway in detail.

Referring now to FIG. 3 the gateway 1 comprises a platform providing the layers 23 and 24 and the CORBA bus 22. OA & M systems 28 are linked to the platform. The top layers 20 and 21 reside in separate computers linked to the CORBA bus 22.

These OA & M systems 28 comprise an enterprise operator 28A, a service supplier 28B, a framework operator 28C, a management user interface 28D, and an external operator systems 28E.

The layer 24 is implemented primarily by a network gateway 31 and by service logic programs in a service gateway 32. The layer 23 is implemented primarily by services and a Parlay interface 41 in the service gateway 32 and by a framework Parlay interface 40 in a framework 36.

Also, both layers 23 and 24 are indirectly accessed by the various OA & M systems 28. Also, the platform comprises a Web server 30, a platform resources bus 35, platform resources 37, platform managers 38, and a management entity 39.

The platform resources 37 include a CORBA event manager 37A and a CORBA alarm manager 37B.

The resources 37 also comprise non-CORBA APIs as follows:

database API 37C,
communications API 37D,
timer API 37E,
memory manager API 37F,
configuration parameter API 37G, and
trace/log API 37H.

The manager 38 comprises a platform manager 38A, an account manager 38B, a network management MIB 38C, and a network resource manager 38D.

The following describes the layers 23 and 24 in more detail. The framework 36 and the service gateway 32 are each linked with the CORBA bus 22 by Parlay interfaces 40 and 41 respectively. Each Parlay interface provides an API and interface instantiation for external access. Two interface categories are provided. The Parlay framework interface 40 provides surround capabilities supporting management of the service interfaces 41 and providing applications with secure and trusted access and discovery of the services provided. The Parlay service interface 41 provides applications with an abstracted programming API to a range of network services and information.

Framework 36:

The framework 36 provides common service functionality as reusable service elements. The framework 36 provides the following:

Management: Simple framework management and service management tasks such as interfacing between services and Parlay management and external management systems 28, providing service deployment and configuration, service start, and service stop. When deploying the service, management database tables and communication channels with platform resources 37, service gateway 32, and the network gateway 31 are created.

Provisioning: Definition of service configuration parameters for the Parlay APIs of the layer 23 on either a global basis or on a limited addressing or user group range such as setting levels for event and alarm management. In addition, common provisioning allows related services to share a common provisioning strategy.

Subscription: Registration of users for service use including setting trigger events of interest to the application operation. Because this is a common subscription interface it provides a uniform approach for users to be associated with different services.

Security: The framework 36 includes a security interface with industry standard security algorithms.

The framework 36 is persistent. That is, if for any reason the gateway 1 is shut down, then when the framework is returned to an active state, all triggers, subscriptions and other settings are restored.

Service Gateway 32:

The service gateway 32 manages interaction between the (layer 24) service logic programs and network traffic delivered via the network gateway 31. In order to achieve this, the service gateway 32 supports the state model required by a particular Parlay service (of the layer 23) for a given network resource protocol. For example, a call control services executing in the service gateway 32 can send and receive messages to and from the network gateway 31 via an appropriate service logic program. This abstract call control service may be provisioned and configured for use with INAP, SIP etc. The service logic programs in the service gateway 32 provide INAP and SIP basic call state machines in order to manage the communication dialogue.

The service gateway 32 uses the functionality provided in the framework 36 (subscription, provisioning etc.), to manage the association between the subscribed trigger events of the applications and the (layer 23) Parlay service instances, with the (layer 24) service logic programs, effectively multiplexing service subscriptions.

The service gateway 32 thus provides a notification demultiplexer, which dispatches network notifications, firstly to the appropriate service logic program and if required, to the application.

Network Gateway 31:

The network gateway 31 implements translation between vendor-supplied stack primitives and the service logic programs of the service gateway 32. It also manages the transaction or dialogue associations for new or ongoing communications between the networks and the services.

The configuration of the network gateway 31 provides consistent mappings between the service logic programs executing within the service gateway 32 and the network resources interfacing with the gateway 1.

A combination of the service gateway 32 service logic programs and functionality of the network gateway 31 provides the layer 24 network service interfaces for interfacing with and controlling the network resources.

Platform Resources 37:

These are generic support resources for access and use by the other functional components of the gateway. These are considered separately from the generic framework resources, as they are not limited to the execution of the services alone. The following are the platform resources:

Database 37C: A persistent data store for all control and configuration tables, provisioning data and subscription data. In addition, if execution of the service also requires persistent data storage, the service can make use of the database 37C via a published API.

Communications 37D: The gateway 1 uses CORBA communications in the architecture in order to realise a distributed solution. However, not all inter-process communications requires the use of CORBA, and a communications library and programming interface is used to ensure consistent and portable implementation of all communications on the gateway 1. This resource is responsible for managing and controlling the communications queues and sockets in a platform-independent manner.

Event Manager 37A: The components of the gateway 1 generate events in order to provide an indication of their operation. The event manager 37A provides a standard interface for all components to log events in a consistent manner. It collects the events, and manages the logging of the event to logs. The event manager 37A supports the following classifications of event:

1. Information
2. Error
3. Critical

The classification of the event is not known by the component generating the event, rather the event manager uses a configurable event management table to define the event details. In this way, events can be reclassified via the event management table. The table can also be used to control the destination log for the event and define additional event information text to be included in the event log.

Through the event management table, events can be defined as 'billable', in which case the event shall be considered appropriate for billing and shall be written to a billing log for later billing processing. The billing strategy is to generate billing logs and raw data for billing processing. The content of these billing logs is configurable by the gateway operator via the management entity 39. The billing logs can then be supplied to a mediation system to generate the charging records for input into a customer billing system. Complete billing flexibility is therefore available to the operator of the gateway.

All events have a configurable event level defined in the event management table. The gateway 1 can be configured by the operator to support an event threshold level. By only supporting the logging of events by the event manager to those below the event level threshold, all event logging can be controlled dynamically.

Alarm Manager 37B: The alarm manager 37B is a special case of the event manager. It provides a standard alarm API and many of the same configurable properties as the event manager as described above. However it is considered to be a separate function from the event manager, as the alarm manager 37B also accommodates alarms generated by the underlying network resources and filtered through the network gateway 31. In addition, when the networks, services, or other components raise an alarm, the alarm manager 37B, in addition to logging the alarm, shall, if required, also report the alarm to the external management user interface 28D and to the network management MIB 38C via the management entity 29. A configurable alarm management table is used to define alarm classifications and reporting.

Timers 37E: Many of the communications dialogues in operation within the gateway require the use of timers to ensure that system resources are not locked as a result of failure to complete or continue the expected dialogue. The gateway platform includes a generic, platform-independent timer management function and programming API. This is used to invoke, and cancel timers, and indicate when timers have elapsed. The exact timer values are configurable via a timer management table.

Memory Manager 37F: This standardises and simplifies all dynamic memory operations carried out on the platform.

This resource is primarily to simplify portability across multiple hardware platforms.

Cparams 37G: The gateway 1 includes a common configurable parameters (Cparams) library. All processes that require configuration use this common resource, and the settings of the parameter values themselves and the ability to refresh the current configuration of the individual processes are controlled via the management entity 39.

Trace/Logging 37B: Informational messages regarding the operation of the gateway components can be provided by this function for inspection by the gateway operator. In addition the level and amount of information recorded can by configured on an individual process basis through the use of Cparams, allowing the degree of tracing and logging to be dynamically controlled.

Management Entity 39:

The management entity 39 is responsible for managing and configuring all key processes and components within the platform. The management entity is itself a process and provides an HTTP interface to the management user interface via the gateway WEB server 30. The main functionality provided by the management entity 39 is:

Platform Resources: The management entity 29 interfaces to the Platform Resources in order to manage all database and configuration data, and interact with the Event and Alarm Managers to ensure delivery of relevant information to the required destination (e.g. GUI, external systems etc.).

The gateway 1 is highly configurable via the Management Entity. This provides the gateway operator with maximum control over the platform operation. Each configurable parameter has a default value (set during installation and used during process start-up), and a range of permissible values.

Platform Manager 38A: The platform manager 38A is responsible for the startup/shutdown of the gateway itself and management of platform resources such as the database. In addition the platform manager provides process management control including the following.

Pprocess start-up/shutdown.

Process status monitoring. The platform manager 38A shall attempt auto restart of process if configured to do so.

Process trace control. Providing a mechanism for support staff to configure the level of trace provided for troubleshooting.

Process statistics control. A mechanism for obtaining counters for process operation and traffic upon command or at regular configurable intervals.

Account Manager 38B: Providing basic account management support for the external users that require access to the gateway. Each external user can be classified to provide different categories of access to the gateway. The account manager 38B is responsible for providing the appropriate Parlay Interface access to those accounts that have been validated for gateway use.

Network Management MIB 38C: A MIB defined for interoperability with external OA&M systems and SNMP is provided.

Network Resource Manager 38D: Each supported network resource shall provide a proprietary mechanism for configuration of the resource and interrogation of the current resource status. The network resource manager provides a common and consistent view of all underlying network resources.

WEB Server: In addition to the platform and process management provided by the management entity 39, the gateway 1 includes a Web server 30 to support the management interfaces. The management systems communicate with the Web server interfaces via HTTP. The Web management interfaces use a combination of JSP's, Java Beans and servlets. This approach allows the management interfaces to be distributed from the Causeway platform if required. Communication between the interface management logic, represented by the servlets and the Parlay interfaces supported by the framework and service gateway are conducted over CORBA, for the Framework Operator, Enterprise Operator and Service Supplier interfaces defined in the Parlay specifications. In addition the management logic required to interface to the management user interface 28D communicates with the management entity 39 via a proprietary internal messaging protocol.

The following describes the external management system 28.

Management User Interface 28D: Provides a basic user interface to control the management and configuration of the gateway 1. In addition to a GUI to carry out standard commands and display results, a script-based component is also included to allow rapid installation and configuration of the gateway. The management user interface 28D is primarily concerned with platform operation, and is strongly linked to the functions provided via the management entity 39 and the platform resources 37.

Framework Operator 28C: Supports basic configuration of the Parlay interface 40, and is responsible for managing and specifying the types of service that are supported within the service gateway 32, and that are accessible via the Parlay interface 40.

Service Supplier 28B: Enables implementations of services to be registered with the Parlay framework interface 40.

Enterprise Operator 28A: Represents the service provider as a logically separate entity from the underlying network operator. Although the enterprise operator 28A can also be the gateway and network operator, this logical separation introduces the potential to open up new business relationships. This optional separation between network operator and service supplier, provides support for service wholesaling (ASPs) and virtual network operator relationships, and allows large corporate or key accounts the capability to become more in control of the services and tailor their use to specific needs.

The enterprise operator 28A role in the gateway 1 is required irrespective of whether there is a logical business distinction. The enterprise operator 28A is responsible for creating and managing the service contracts and subscription accounts and relationships between applications and the services they wish to use. A hierarchical subscription topology is supported through the use of service profiles and subscription assignment groups, such that groups of similar application users can have access to the same grouping of services.

The enterprise operator 28A creates valid subscription accounts before an application can make use of the network services accessible through the Parlay interface 40.

Turning again to the application side, the applications 10, 13, and 14 execute the logic to provide the application experience required by the end user or client. The applications may execute locally in the gateway 1 if the operator wishes to provide full application solutions on a single platform, or (as illustrated) remotely from the gateway 1 and using CORBA for communication.

The applications 10, 13, and 14 manage the Parlay communication between the application and the parlay interface 40 in order to obtain Parlay framework 36 access and service discovery. Also, once an appropriate service has been selected for use, the application interacts with the service via the Parlay interface 41 in order to use the required network resource functionality requested by the application.

The development of applications by service providers (including enterprise, virtual and 'real' network operators), independent software vendors, and potentially end users themselves is simplified by using a Parlay client proxy (PCP) implementing the layers 20 and 21. This is provided to simplify the Parlay communication to the layers 23 and 24 and encourage application component re-use based on simple use of the services, thereby simplifying the application development activity. The gateway operator, and parties other than the gateway operator, may use a PCP.

In order to integrate the gateway 1 completely within a network operators domain, interfaces to existing operator management systems, such as network management, customer care, billing etc., are provided. The gateway 1 support this integration by providing external access to the management entity 39 via a number of access protocols, e.g. SNMP, CORBA, HTTP. The gateway operator configures the external access provided via the management entity to support appropriate interoperability between gateway management functions and external systems.

Figure 4:
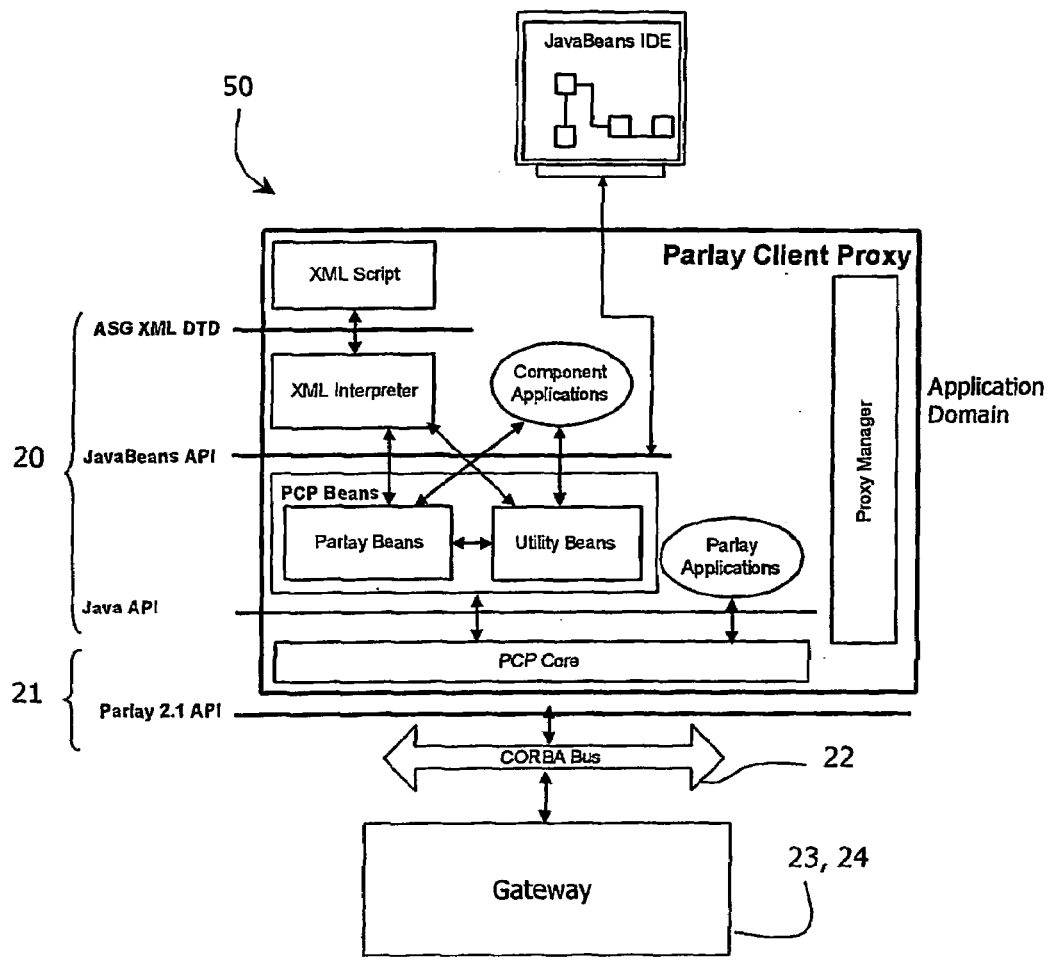
FIG. 4 is a diagram illustrating application-side structure of the gateway in detail.

Referring to FIG. 4 the PCP 50 is illustrated. The layer 20 comprises an XML interpreter, Parlay Beans, Utility Beans, and component applications. There is also a common proxy manager. The PCP 50 is hosted by the ASP together with the application and allows easy interfacing with short lead times to the layers 23 and 24 as illustrated in FIG. 2. The layer 21 comprises Parlay APIs.

The Parlay Beans are re-usable objects which may be easily instantiated to provide an application interface, a Parlay interface, and logic in-between. An XML script function provides a user interface to allow an interfacing component to be easily instantiated. The XML interpreter automatically performs the low-level instantiation of the Parlay Beans to complete the interfacing component.

Thus, the PCP 50 comprises "raw" components for the layer 20, Parlay APIs for the layer 21, and tools to allow simple instantiation of the layer 20 components (the Parlay Beans) to suit the application.

The PCP 50 shields the application developer from the complexity of the Parlay API 21 and from the intricacies of CORBA. It provides a number of programming interfaces, providing the application developer with a choice ranging between complete responsibility for developing applications directly based on the Parlay interface definition, (to layer 21), or alternatively developing a Java based application using a component based Java Beans IDE or a simple XML based scripting interface (to layer 20). The choice of interface will depend on the skill of the application developer and the complexity of the application to be developed. Simple applications can be constructed from beans or using scripts, whereas more complex applications shall require a fuller appreciation of how the Java programming interface supports Parlay service using the PCP core.

In order to simplify the development of Parlay client applications, the PCP 50 exposes Parlay like Java Beans to application developers. These Beans run on the PCP Core, which consists of Java Parlay object implementations and other related objects. The PCP core contents are not directly accessible to the Parlay applications, instead they are controlled by the Parlay Beans. The core is designed to provide the application with full Parlay functionality but in a controlled and optimised manner.

The primary function of the PCP Core is to convert between the Parlay API which uses CORBA and Java implementations of the Parlay objects. The key advantage is that it enables the development of Parlay applications without requiring knowledge of CORBA.

PCP Beans

These components provide robust, efficient, reusable functionality that can be quickly integrated to produce PCP applications. Applications developed using these PCP Beans can then run against the PCP Core in an identical manner to any other PCP application.

Although the majority of the PCP Beans may have no GUI appearance of their own, their properties can be configured and they can still be assembled visually inside a JavaBeans IDE.

The PCP Beans enable the development of Parlay applications without requiring a detailed knowledge of the Parlay API. An application developer merely requires a conceptual understanding of Parlay and of the services operating within the gateway 1, and can assemble applications from several of the PCP Beans. The PCP Beans provide a simple, easy to use service creation environment for application development.

There are two categories of PCP Beans provided with the PCP 50. The first category, known as the Parlay Beans, provides reusable functionality. The Parlay Beans respond to events from other PCP Beans and invoke operations on the PCP Core. Examples include JavaBeans to perform authentication with the Causeway Parlay Gateway, JavaBeans to discover services running in the gateway and JavaBeans that encapsulate reusable functionality for various services running in the gateway.

The second category of PCP Beans, known as the Utility Beans, provides reusable functionality that is not specific to the PCP Core. Utility Beans do not invoke any operations on the PCP Core. They include JavaBeans for logging and tracing, for database access, and for timed invocations.

The XML Interpreter includes a Document Type Definition (DTD) that defines the interactions between the various JavaBeans provided by the PCP 50. The XML Interpreter enables applications to be described using XML, where each XML node represents one of the PCP Core or Utility Beans, and the Bean properties are represented by node parameters.

The proxy manager is a management entity responsible for managing the PCP 50 and the applications that execute within it. It performs application lifecycle and profile management functions. Application lifecycle management comprises the functionality to install, activate, deactivate and uninstall applications on the PCP 50. Application profile management comprises of the configuration of PCP settings for each application deployed on the platform.

It will be appreciated that the invention provides a simple migration path from current network signalling and communication protocols (2G) to new and emerging technologies (3G) by acting as an adapter between the applications and network resources. Also, the gateway 1 can interrogate and utilise the capabilities of the network as a single logical entity, rather than directly communicating with many individual network resources. The gateway 1 supports network independence and portability across vendor-supplied hardware products. In addition, the gateway 1 provides a suite of services for administration very effectively. In the layers 20 and 21 the gateway 1 allows wide application developer choice of interfaces, including Parlay APIs in the Java or C++ languages, simple Java application development where distributed middleware is hidden from the application developer, a component-based development environment using Java Beans, and script-based application developments.

In addition, the PCP includes a software development kit (SDK) emulation mode, in which application development using all the power and functionality of the APIs available in the PCP are combined with an integrated emulation and test facility. This is accomplished on a single platform with no requirement for gateway layers 23 and 24 or network connection, so allowing application developer communities to develop and test application ideas in isolation from network operators and yet in confidence that the application meets the demands of the standardised APIs.

The invention is not limited to the embodiments described but may be varied in construction and detail.

The invention claimed is:

1. A gateway for interaction of applications with telecommunication network resources, the gateway comprising means for interfacing with said applications and means for interfacing with said network resources, wherein, the network interfacing means comprises:
   an outer layer of network service interfaces for interfacing with and controlling network resources, service logic programs, and means for managing interaction between the service logic programs and network traffic, wherein the service logic programs provide call state machines for managing communication dialogue;
   an inner layer of open-standard APIs for interfacing with network resources having corresponding open-standard APIs, and for interfacing with said network service interfaces;
   a notification de-multiplexer for dispatching network notifications to the service logic programs and to applications; and
   a network gateway comprising signaling stacks and means for performing translation between said stacks and the service logic programs.

2. The gateway as claimed in claim 1, wherein the gateway further comprises a middleware bus residing between said application interfacing means and said network interfacing means.

3. The gateway as claimed in claim 2, wherein the network interfacing means further comprises:
   an open-standard framework interface to the middleware bus, and
   an open-standard service interface to the middleware bus for interaction with applications.

4. The gateway as claimed in claim 1, wherein the gateway further comprises a middleware bus residing between said application interfacing means and said network interfacing means; and wherein said middleware bus complies with the CORBA standard.

5. The gateway as claimed in claim 1, wherein the gateway comprises a framework comprising management, provisioning, subscription, and security functions to the network interfacing means.

6. The gateway as claimed in claim 1, wherein the gateway comprises platform resources for providing the following functions to the network interfacing means:
   a persistent data store for control and configuration tables; and
   a communications function for internal communication which does not use a distributed object middleware communication mechanism; and
   an event manager providing a standard interface to functions within the gateway for receiving events, for classifying received events into information, error, and critical categories, and for logging the events.

7. The gateway as claimed in claim 6, wherein said platform resources further comprise a timer function for invoking and cancelling timers for functions of the gateway.

8. The gateway as claimed in claim 1, wherein the gateway comprises:
   a management entity for routing gateway management signals;
   a Web server linked with the management entity and comprising means for communication with management interfaces on separate hardware platforms;
   a platform manager linked with the management entity and comprising means for controlling start-up and shut-down of a primary hardware platform for the network interfacing means.

9. The gateway as claimed in claim 1, wherein the means for interfacing with the applications comprises application-side components having an application interface and logic and network-side open-standard APIs for communication with the open-standard APIs of the network interfacing means.

10. The gateway as claimed in claim 9, wherein the application-side components and the network-side open-standard APIs are present on a platform for each application and said platforms are remote from a platform of the network interfacing means.

11. The gateway as claimed in claim 9, wherein the application-side components and the network-side open-standard APIs are present on a platform for each application and said platforms are remote from a platform of the network interfacing means; and wherein the application-side components comprise re-usable objects and means for instantiating the objects to provide a component.

12. The gateway as claimed in claim 9, wherein the application-side components and the network-side open-strand APIs are present on a platform for each application and said platforms are remote from a platform of the network interfacing means; and wherein the application-side components comprise re-usable objects and means for instantiating the objects to provide a component; and wherein said instantiation means comprises an XML interpreter for interpreting user inputs of high-level interfacing commands.

* * * * *